Feb. 16, 1965  R. A. SMITH ETAL  3,169,520

COOKING OVEN

Filed April 10, 1963  2 Sheets-Sheet 1

INVENTORS
Raymond A. Smith
Howard A. Anderson
BY
*Francis E. Blake*
ATTORNEY

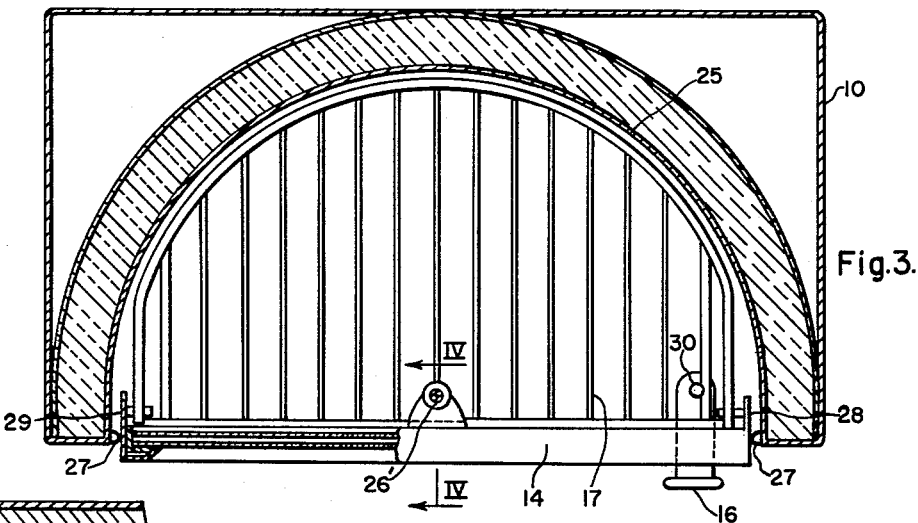
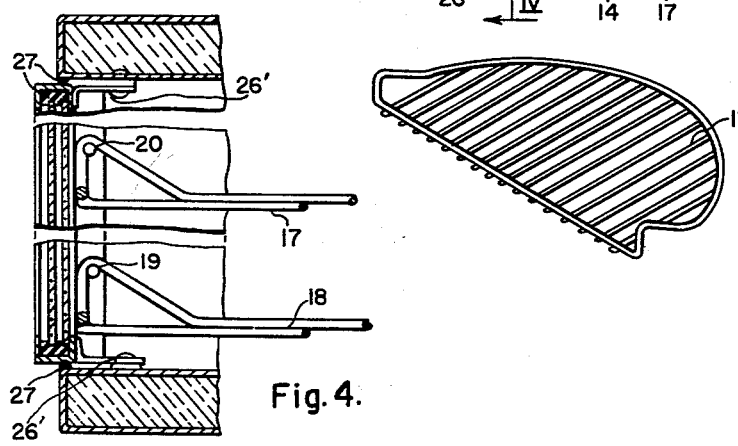
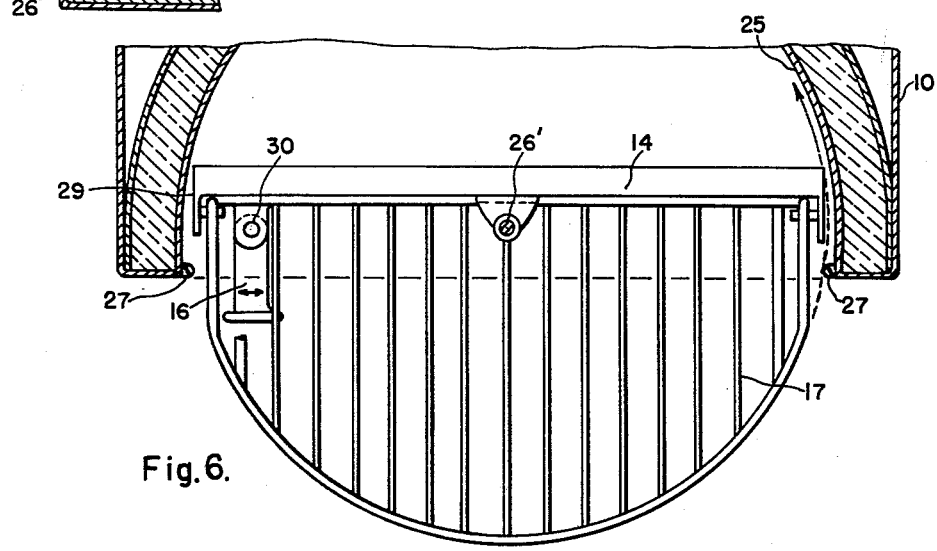

United States Patent Office 3,169,520
Patented Feb. 16, 1965

3,169,520
COOKING OVEN
Raymond A. Smith, Bradfordwoods, and Howard A. Anderson, Pittsburgh, Pa., assignor to Westinghouse Electric Corporation, Pittsburgh, Pa., a corporation of Pennsylvania
Filed Apr. 10, 1963, Ser. No. 272,088
3 Claims. (Cl. 126—338)

The present invention relates to cooking oven structures.

Present day home kitchen design provides for the use of built-in wall oven structures in order to economize on space and to improve appearance of the kitchen. Many built-in oven arrangements are combined with an open top range which may be below and in front of the oven. With such an arrangement, there is sometimes a problem when it becomes necessary to reach over a hot range into the oven. Even though the cooking oven may not be built into a wall or associated with an immediately adjacent open top range, there may still be problems in loading the oven when it becomes necessary to reach over the open oven door as used in the previous oven arrangements.

It is a principal object of the present invention to provide an improved oven arrangement that will facilitate the loading and unloading of the oven.

Another important object of the invention is to provide an improved cooking oven that will enable foods to be moved into and out of the oven simultaneously with the movement of the oven door from open to closed position and vice versa, thus facilitating the loading and unloading of the oven and avoiding the necessity of reaching over an open oven door in order to gain access to the interior of the oven.

In accordance with the invention, the oven enclosure is provided with a front side wall opening, as may be conventional. The oven door, having front and back wall surfaces, is mounted on vertical pivot hinges, however, instead of the previously used horizontal hinges. In addition, one or more generally horizontal oven shelves are detachably supported from the back surface of the oven door to be movable therewith as the door is pivoted to be opened to thereby move the shelves from within the oven to without the oven. Thus, the oven shelves may be loaded and unloaded while the shelves are extending outward from the plane of the oven side wall opening and from the back surface of the door when the door is in the open position. In such manner, the oven may be loaded and unloaded simply by moving the door on its vertical pivot hinges from the open position to the closed position and vice versa.

Further objects, features and the attending advantages of the invention will be apparent with reference to the following specification and drawings, in which:

FIG. 3 is a horizontal sectional view as seen downward midway between the top and bottom walls of the oven;

FIG. 4 is a fragmentary vertical section on the line IV—IV of FIG. 3 as seen in the direction of the arrows;

FIG. 5 is a detailed perspective view of one of the shelves as may be used with the oven of the invention; and FIG. 6 is a fragmentary horizontal sectional view similar to FIG. 3 but showing the oven door in the open position with the oven shelf extending outward from the plane of the oven door opening.

Figure 1:
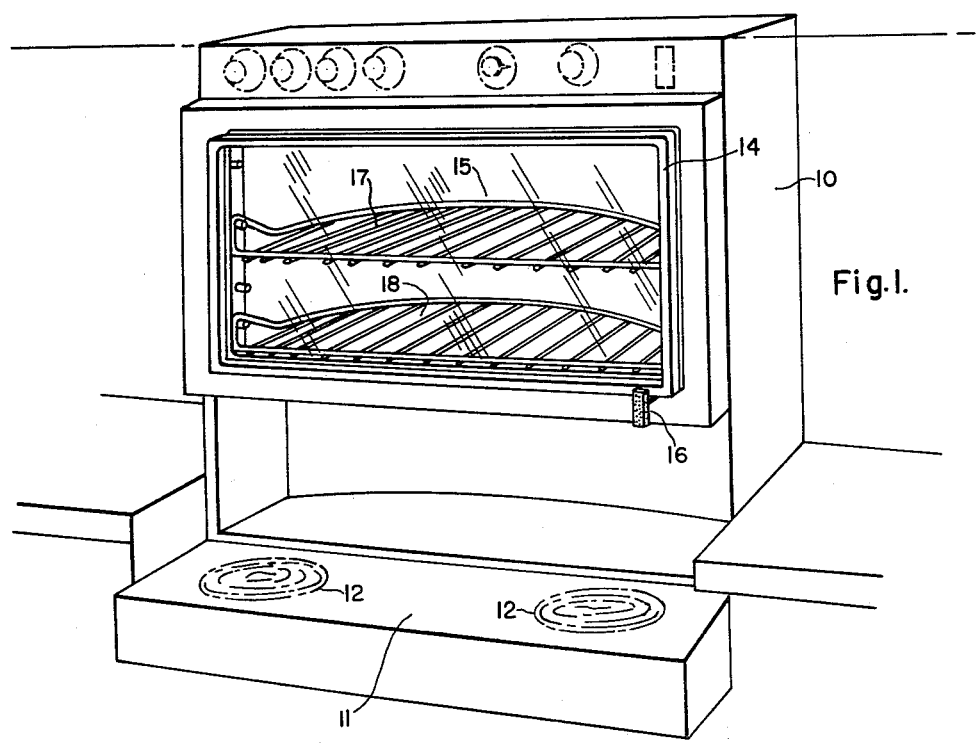
FIGURE 1 is an elevational view of the oven of the invention with the door shown in the closed position and with a transparent wall for the oven door so that the interior of the oven may be visible.

Referring now to the drawings in detail, a presently preferred embodiment of the invention will be described as it may be arranged for use as a built-in wall oven in association with an open top range. It should be understood however, that the oven arrangement of the invention to be described is not limited to use as a built-in wall oven, but may be used in a free standing oven arrangement. As will be seen most clearly in FIGS. 1 and 2 of the drawings, the oven is comprised of an enclosure 10 which may be built into the kitchen walls at a position above and behind an open top range structure 11. The range structure 11 forms no part of the present invention, but as shown is comprised of a horizontally slidable drawer containing one or more surface heating units 12 and 13. The cooking oven enclosure 10 is provided with a sidewall opening facing the front of the oven which is adapted to be closed by the oven door having the generally rectangular frame 14 in which may be mounted, if desired, the transparent door wall 15. In accordance with the invention, the door frame 14 is mounted on vertical pivot hinges which will be later described in more detail in connection with FIGS. 3–6 of the drawings and is arranged to be moved and rotated from open to closed position by means of the operating handle 16. It is obvious that the oven door structure including the frame 14 and the transparent wall 15 is thereby provided with front and back wall surfaces and the arrangement is such that when the oven door is in the closed position, the back wall surface of the oven door faces the interior of the oven and when the door is rotated to the open position the back wall surface of the door faces out of the oven.

Figure 2:
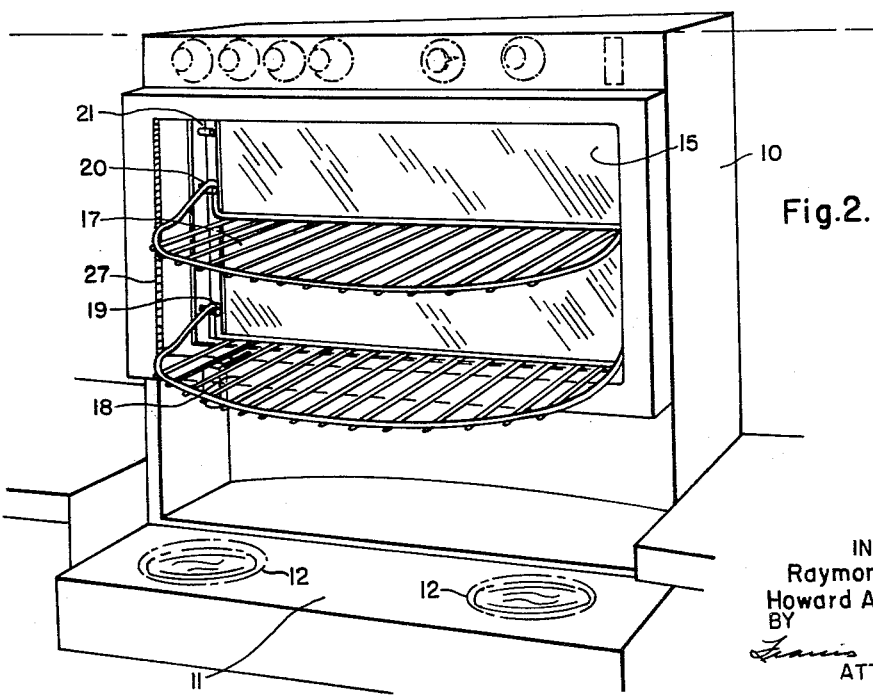
FIG. 2 is a view similar to FIG. 1 but showing the oven with the oven door in its open position and the oven shelves extending outward from the oven.

A plurality of shelves such as the shelf 17 and the shelf 18 are secured to the back wall surface of the oven door to be carried thereby when the door is rotated to be opened to thus move the shelves from a position within the oven as shown by FIG. 1 to a position without the oven as shown by FIG. 2. It may be preferable that the shelves 17 and 18 be detachably secured to the rear frame structure of the door adjacent the rear surface of the door and for this purpose various ones of the plurality of pegs such as shown at 19, 20 and 21 are provided to detachably secure the respective oven shelves at various selectable heights in generally horizontal planes to the rear surface of the oven door. It will be noted that each of the shelves 17, 18 is provided with shaped surfaces forming hooks to cooperate with various selected ones of the pegs such as shown at 19, 21 to detachably secure the respective shelf to the back surface of the door.

As shown more clearly by FIGS. 3–6 of the drawings, the oven interior side wall 25 may be semicircular in shape and each of the oven shelves such as the shelf 17 may be similarly semicircular in shape to complement the semicircular shape of the oven sidewall. Also, as more clearly shown by FIGS. 3, 4 and 6 of the drawings, the oven door frame 14 is pivotally secured on vertical pivot hinges such as the pivot hinges 26, 26' to the walls and top, respectively, of the oven enclosure. It will be noted that the pivot hinges 26, 26', in the preferred arrangement of the invention, are positioned behind the plane of the opening in the side wall of the oven and at substantially the vertical axis of the semicircular interior oven wall. This provides, as will be described hereinafter, a desirable sealing action when the door is rotated from the open position shown by FIG. 6 and FIG. 2 to the closed position shown by FIG. 3 and FIG. 1 of the drawings.

A sealing gasket 27 is secured to the oven opening sidewall surfaces to extend entirely around the oven opening. When the oven door is rotated to the closed position as shown by FIG. 3 of the drawings, all of the door frame sidewall surfaces, such as the sidewall surfaces shown at 28 and 29, engage the sealing gasket 27 at all points entirely around the door to thus seal the oven.

When the door is rotated to the open position as shown by FIG. 6 of the drawings, the sidewall surfaces such as shown at 28 and 29 no longer engage the sealing gasket 27 in view of the rearward position of the oven door pivots 26, 26'. Thus, when the oven door is again rotated to be closed, a desirable wedging action between all of the sidewall surfaces, such as surfaces 28, 29, of the oven door frame and the sealing gasket 27 may be caused to take place to compress the sealing gasket 27 and provide a firm and effective seal.

In order to facilitate the movement of the oven door from open to closed positions and vice versa, the operating handle 16 may be pivotally secured to the rear portion of the door frame at the pivot point 30. Preferably, the operating handle 16 should extend from beneath the lower edge of the oven door as shown in order to avoid the necessity of reaching upward to open the door when the oven structure is built into a wall above the counter top or the like. It should be obvious that, as the operating handle 16 is pulled outward to rotate the oven door about the vertical pivots from the closed position, the handle 16 will be caused to pivot about its vertical pivot 30 to the position shown by FIG. 6 of the drawings. Thus, by pulling outward and to the left as seen by FIG. 3 of the drawings, the oven door may be opened and similarly by pulling outward and to the right as seen by FIG. 6 of the drawings, the oven door may be closed.

The advantages of the oven and oven door arrangement of the invention should now be readily apparent. In order to load or unload the oven, it is only necessary to rotate the door between open and closed positions to thereby move the oven shelves between positions extending outward of the oven to positions extending within the oven. Various modifications may be made within the spirit of the invention. For example, although the preferred embodiment of the invention is arranged to mount the oven door on vertical pivots intermediate the door opening, it should be understood that the vertical pivots may be positioned at other positions such as at the side of the oven door if so desired. Also, although a semicircular shape has been shown for the oven interior sidewall surfaces and the complementary oven shelves, it should be understood that various other shapes for the sidewalls forming the interior walls of the oven may be used and full or partial shelves may also be used depending upon the desired configuration of the oven and door structures.

We claim as our invention:

1. A cooking oven comprising, an oven enclosure having a sidewall opening, an oven door having front and back surfaces and mounted on substantially vertical pivot hinges to be moved from a closed position with its back surface facing the interior of the oven to an open position with its back surface facing out of the oven, at least one generally horizontal oven shelf supported from the back surface of said door, and a door opening handle movably secured to the door to extend outward in front of the oven when the door is in any position from closed to open.

2. An oven comprising, an oven chamber having top and bottom walls and a semicircular sidewall to form an oven opening between opposite ends of the semicircular sidewall, a pivotal door having front and back surfaces, upper and lower pivot hinges for the door fastened to top and bottom oven walls respectively intermediate the sidewalls of the opening and behind the plane of the oven opening, said door being thereby enabled to be moved from a closed position with its back surface facing the interior of the oven to an open position with its back surface facing outward, a sealing gasket secured to the oven walls about the oven opening to be engaged by the side edges of the door in the door closed position, a door opening handle movably secured to the door to extend outward in front of the oven when the door is in any position from closed to open, and at least one semicircular oven shelf secured to the back surface of said door and shaped to complement the semicircular shape of the oven sidewall whereby, when said door is moved to the open position, said shelf is moved out from within the oven to a position without the oven.

3. The invention of claim 2 in which the shelf securing means is arranged to detachably secure said shelf to said door.

References Cited in the file of this patent
UNITED STATES PATENTS

| | | |
|---|---|---|
| 1,070,118 | Cornyn | Aug. 12, 1913 |
| 2,051,132 | Dart | Aug. 18, 1936 |
| 2,944,410 | Mann et al. | July 12, 1960 |
| 2,976,101 | Rooney | Mar. 21, 1961 |
| 2,996,346 | Sharpe | Aug. 15, 1961 |